United States Patent [19]

Boggs et al.

[11] 4,024,528
[45] May 17, 1977

[54] REMOTE SWITCHING SYSTEM

[76] Inventors: Luther M. Boggs; Richard Q. Boyles, both of P.O. Box 28501, Atlanta, Ga. 30328

[22] Filed: Oct. 30, 1975

[21] Appl. No.: 627,144

[52] U.S. Cl. .................. 340/310 A; 340/310 CP
[51] Int. Cl.² ................................... H04M 11/04
[58] Field of Search ................ 340/310 CP, 310 A

[56] References Cited
UNITED STATES PATENTS

| | | | |
|---|---|---|---|
| 3,274,578 | 9/1966 | Block | 340/310 CP |
| 3,287,722 | 11/1966 | Craig | 340/310 CP |
| 3,389,388 | 6/1968 | Helsing | 340/310 R |
| 3,460,121 | 8/1969 | Wattenburg | 340/310 CP |
| 3,462,756 | 8/1969 | Mills | 340/310 CP |
| 3,594,584 | 7/1971 | Woods | 340/310 A |

Primary Examiner—Thomas B. Habecker

[57] ABSTRACT

A remote switching system in which operation of a load is controlled by signals generated at a remote location and transmitted along an existing AC power line. The system includes a signal transmitter which can be plugged into an AC line socket, and which can operate to place a transient control signal on the AC power line. The system also includes a receiver which is connectable in series with a load to be remotely controlled, and which closes a switching circuit between the AC power line and the load when a switching signal on the power line is detected. The control signals are imposed on the AC line voltage by the transmitter only during an early time in a half-cycle of the power line voltage, before noise transient signals generally appear on the half-cycle, and the receiver is sensitive to control signals only during a corresponding portion of each half-cycle, thereby greatly reducing susceptibility of the switching system to noise on the power line. The receiver is sufficiently compact to fit within a switch box used in conventional household wiring, so that the receiver switch circuit can be connected in parallel with an existing load switch for alternative operation of the load from a remote location. The receiver is constructed to provide a heat transmission path from the internal receiver circuit components which produce heat during operation, to the external load switch and switch box surfaces, from which the heat can be dissipated into the ambient environment.

15 Claims, 6 Drawing Figures

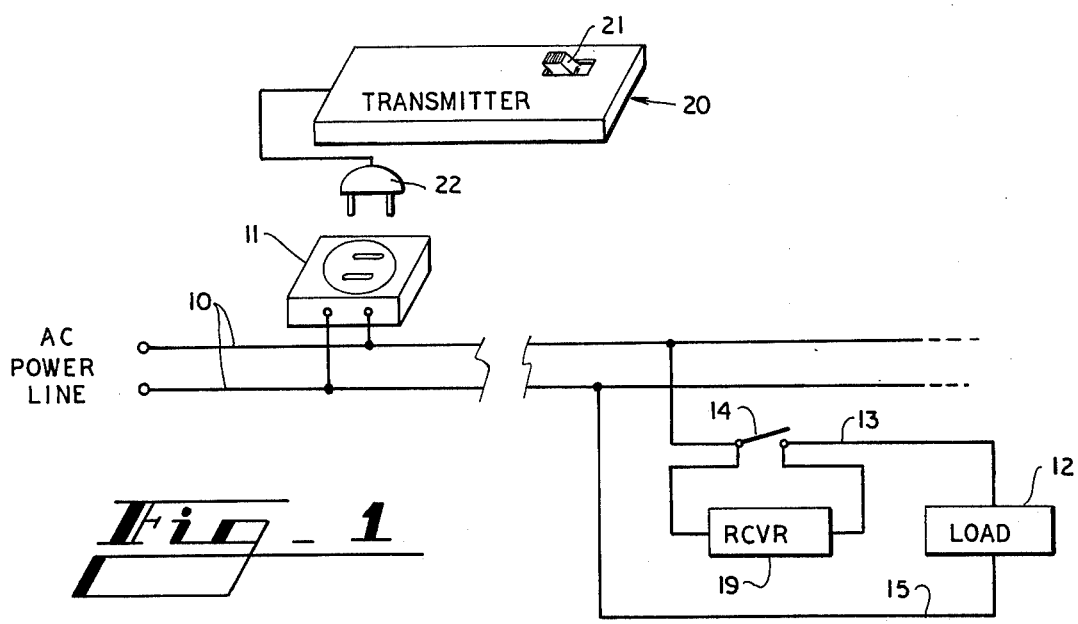
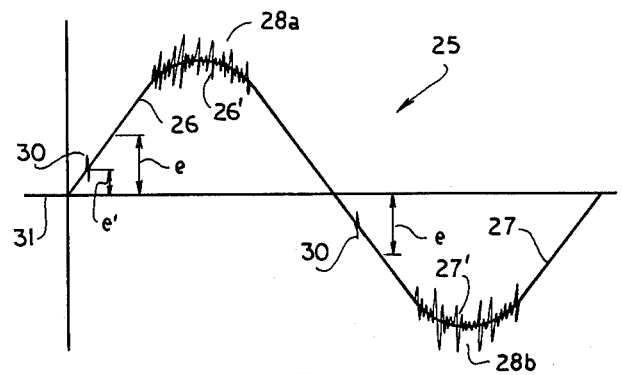
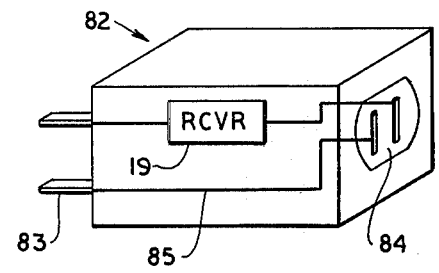
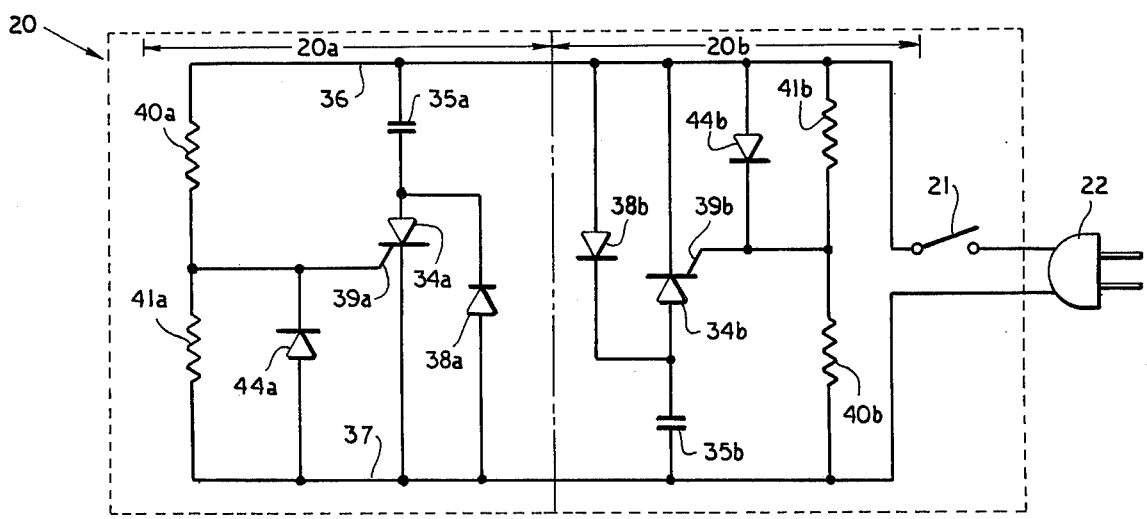

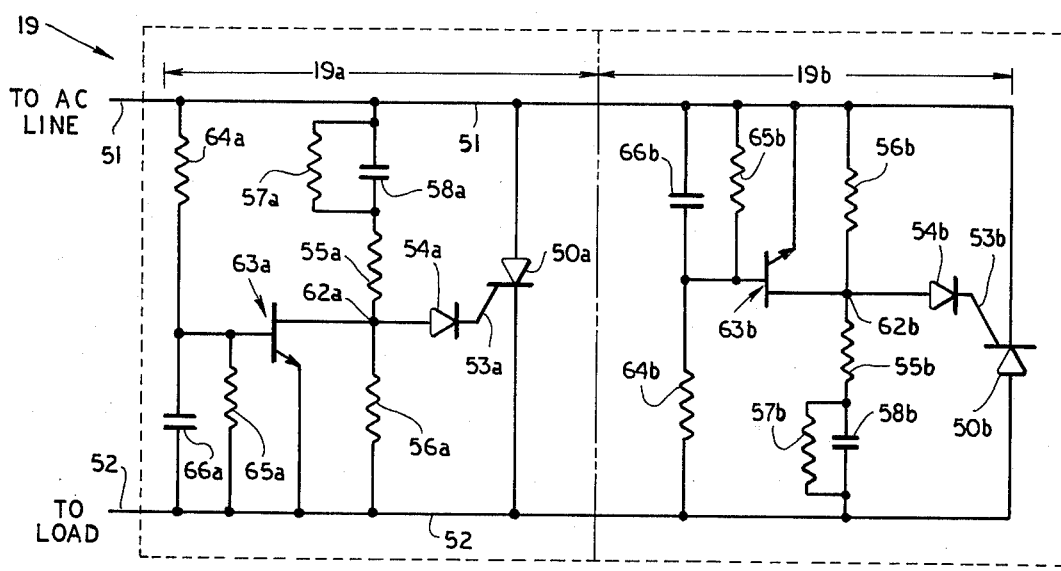
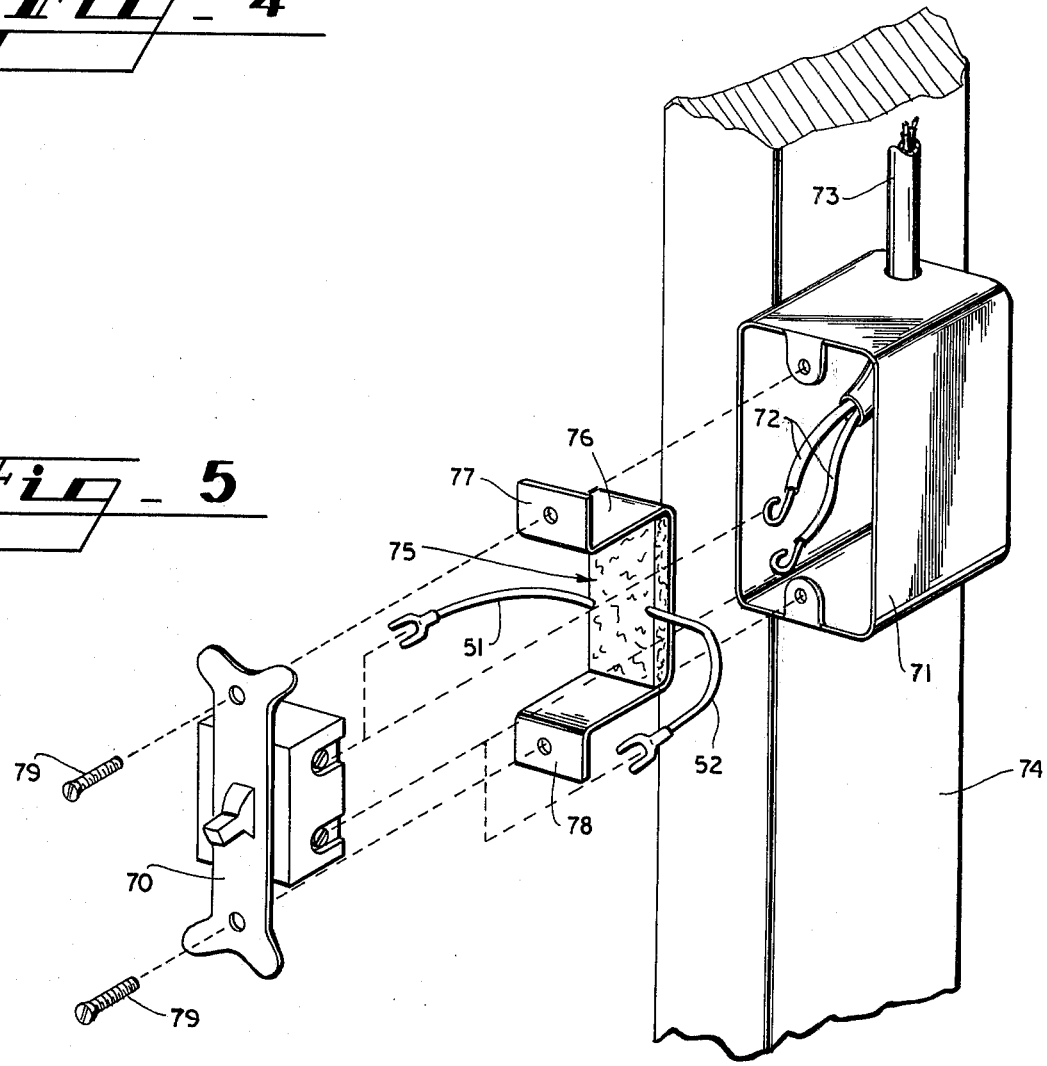

4,024,528

REMOTE SWITCHING SYSTEM

This invention relates in general to remote switching systems, and in particular to a remote switching system which utilizes an AC power line to conduct control switching signals.

There are many occasions where it is desired to control the operation of an electrical circuit from a remote location. While the art is replete with complex and sophisticated telemetry systems which perform various types of remote-control functions, such systems are obviously inappropriate for situations where, for example, it is desired to control a load circuit, such as outside lighting or an alarm device, from a switch located elsewhere in a residence or business. While remote switching functions such as the foregoing example can be accomplished by having an electrician provide the appropriate circuit wiring, such a solution is obviously expensive to accomplish and cannot be rapidly changed, should it be desired to move the location either of the remotely-situated switch or the switched circuit at some later time.

Remote switching circuits have been proposed which utilize the AC line to transmit switching signals between a transmitting location and a receiving location. Examples of such prior-art systems are found, for example, in U.S. Pat. Nos. 3,399,397; 3,462,756; and 3,594,584. Such prior art systems have suffered from one or more deficiencies, however which have prevented such systems from finding widespread user acceptance. One such problem is the susceptibility which many such systems have to extraneous noise signals which may be present on the AC power line. Such noise signals are frequently generated by various electrical devices such as lamp dimmers, electric drills, and other common electrical devices which generate transient signals while operating. The transient noise signals typically include voltage spikes or impulses which have a high frequency relative to the AC power frequency, and which resemble the switching signals being transmitted on the power line. It has been found that these transient noise signals cause false operation of prior-art receiving apparatus which controls a load switching device in response to a transient voltage signal on the AC line.

Another problem frequently encountered with AC line signaling devices of the prior art is the operational requirement that AC line voltage must be maintained across the remote receiver switch device at all times. This requirement means that the receiver switch device cannot simply be connected in series with the load to be controlled, since the result of such series connection would be a voltage of zero volts present across the terminals of the receiver device whenever the receiver switch device was switched "on" to energize the load. The inability of prior-art receiver devices to be connected in series across a load has substantially limited the utility of such devices.

Yet another problem encountered with AC line switching devices of the prior art is the requirements, inability of such devices to accomplish direct control of utility lighting circuits or other loads which have substantial power requirements without using intermediate relays or other power switching devices.

The remote switching system of the present invention utilizes the relatively quiet or noise-free early portion of the half-cycles of AC line voltage in which to transmit and receive switching control signals. The receiver of the present invention is sensitive to control signals only during this essentially noise-free early portion of each half-cycle, so that extraneous power line noise which occurs later in each half-cycle is ignored and cannot cause false triggering of the receiver switch. The receiver circuit of the present invention requires operating voltage from the AC line only before the receiver switch is turned on in response to a transmitted control signal, so that the receiver can be connected in series with a load to be controlled.

Accordingly, it is an object of the present invention to provide an improved remote switching system utilizing an AC power line.

It is another object of the present invention to provide a remote AC line switching system which is substantially insensitive to noise or other transient signals which might otherwise cause false operation of the switch.

It is a further object of the present invention to provide a remote AC line switching system in which the receiver switch is directly connectable in series with a load to be controlled.

It is yet another object of the present invention to provide a remote AC line switching system in which the receiver switch is sufficiently compact for installation in a switch box of conventional design.

It is another object of the present invention to provide a remote AC line switching system in which the receiver switch configuration and structural arrangement function to transfer internally generated heat to the external surfaces of a conventional existing switch and switch box surfaces for dissipation to the ambient environment.

The foregoing and other objects and advantages of the present invention will become more readily apparent from the following discussion of a disclosed embodiment, in which:

FIG. 1 is a block diagram showing the placement of control elements according to a disclosed embodiment of the present invention;

FIG. 2 is a typical AC line voltage waveform, showing extraneous noise conditions as well as control signals generated according to the disclosed embodiment;

FIG. 3 is a schematic diagram of a control transmitter according to the disclosed embodiment;

FIG. 4 is a schematic diagram of a control receiver according to the disclosed embodiment;

FIG. 5 is an exploded pictorial diagram of a typical remote switch installation according to the disclosed embodiment; and FIG. 6 is a schematic diagram showing an alternative placement of the receiver according to the disclosed embodiment.

There is shown in FIG. 1 an AC power line circuit 10 which is connected to a source of conventional AC power, such as a 60-cycle power line, and which may have at least one conventional socket 11 connected across the line for plug connection of any suitable electrical device. It will be understood that the AC line 10 may represent the wiring in a house, apartment, office, or other location, and that such AC line wiring usually includes several separate interconnected circuits which may have numerous plugs, lighting circuits, and the like.

An electrical load 12 is connected to the AC line 10 through a first line 13, which may include an existing conventional on-off switch 14, and a second line 15.

The load 12 can be any electrical device or circuit, such as a lighting circuit or the like, which is desired to be controlled according to the present invention. It will be understood, moreover, that the existing switch 14 may be a wall-mounted switch which is directly wired into the line 13.

Connected in parallel across the conventional switch 14 is the receiver 19, and it can be seen that the switch-paralleled connection of the receiver 19 effectively places the receiver in series with the power line circuit of the load 12.

The present remote switching system includes a transmitter 20 mounted within a housing which contains a control switch 21. The transmitter 20 is preferably provided with a conventional AC plug 22 which is connectable to any conventional socket such as the socket 11. As will become apparent, the transmitter 20 is operable in response to the control switch 21 to impose a control signal on the AC line 10, and this control signal is received by the receiver 19 to establish a switching circuit through the receiver for supplying AC line power to the load 12. The receiver 19 interrupts the supply of power to the load 12 whenever the transmitter control switch 21 is operated to terminate the control signals on the AC line.

Turning to FIG. 2, there is shown at 25 a typical cycle of AC line voltage which is present on the AC line 10, consisting of a positive half-cycle 26 and a negative half-cycle 27. Although it is generally known that various types of electrical devices generate electrical noise signals typically characterized by transient voltage spikes having a high frequency relative to the power line frequency, it has been determined that such transient noise conditions (illustrated in FIG. 2 at 28a and 28b) first appear relatively late in the increasing instantaneous voltage of each half-cycle. Thus, the noise transients 28a commence near the peak 26' of the positive half-cycle 26, while the noise transients 28b commence near the negative-going peak 27' of the negative half-cycle 27. These noise transients 28a and 28b frequently were erroneously detected by switching systems of the prior art, since the noise transients would sometimes be indistinguishable from the control signals intended to operate the receiver.

Since the early part of the instantaneous voltage in each half-cycle is found to be relatively noise-free, the transmitter 20 of the present operation operates to apply a control signal in the form of a transient voltage spike 30 early after each crossing of the zero-voltage line 31, so that each voltage spike 30 appears in each half-cycle not later than a predetermined maximum voltage $e$ in that half-cycle. This portion of the sine wave between peak voltages is referred to as a "slope portion". It will be apparent from the foregoing discussion that the maximum voltage $e$ is selected to be less than the instantaneous voltage where substantial noise transients 28a and 28b commence to appear. Voltage spikes 30 are generated by the transmitter 20 at an instantaneous voltage $e'$ of approximately 15 v. in a specific embodiment of the present invention, with a maximum instantaneous voltage $e$ of approximately 20 v., although the foregoing voltages are not considered limiting to the present invention. It has been found that substantial "hash" or noise transients produced by light dimmer controls commence at an instantaneous voltage of about 50v, by way of example.

The transmitter 20 is schematically shown in FIG. 3, and it will be seen that this transmitter consists of two transmitter sections 20a and 20b which are connected to the AC line 20 when the control switch 21 of the transmitter is closed. The transmitter section 20a provides voltage spikes 30 on each positive half-cycle 26 of the power line voltage, while the transmitter section 20b provides similar voltage spikes on each negative half-cycle 27. Accordingly, the transmitter section 20b in the disclosed embodiment has inverted polarity identity to the transmitter section 20a, which is now disclosed in detail. Reference numerals using the suffix $a$ are used in the following description of the transmitter section 20a, and the corresponding components of transmitter section 20b are designated in FIG. 3 by corresponding reference numerals bearing the suffix $b$.

It should be noted that although only one 115v phase is shown in FIG. 1 and identified as AC power line 10, the remote switching system will operate satisfactorily when both phases of a residential wiring system are used. Normally AC power is provided to a residence via a three-wire two-phase system consisting of two "hot" wires and one neutral. A control voltage spike 30 of sufficient amplitude is transmitted through the neutral line to operate the receiver 19 even if the side of the receiver is on the opposite neutral from transmitter 20.

The transmitter section 20a includes a thyristor switching device such as the silicon controlled rectifier (SCR) 34a connected in series with the capacitance 35a across the lines 36 and 37. The SCR 34a is bypassed by a diode 38a which is connected to have forward polarity in opposition to the forward polarity of the SCR 34a.

The gate 39a of the SCR 34a is connected to a voltage divider circuit provided by resistances 40a and 41a. The gate 39a is bypassed to the line 37 by the diode 44a, which prevents the gate 39a from damage due to reverse bias when line 36 is negative with respect to line 37.

Considering the operation of the receiver 20, it is assumed for convenience that the control switch 21 is closed at the time when the AC line voltage has just crossed the zero-voltage line 31 in a positive-going direction to commence the positive half-cycle 26 shown in FIG. 2, and that the capacitance 35a received a charge through the diode 38a during the preceding negative half-cycle. The respective values of the voltage divider resistances 40a and 41a are selected so that the SCR gate 39a is provided with sufficient voltage and current to turn on the SCR at a time when the instantaneous AC line voltage is a predetermined voltage $e'$, as previously discussed. When the SCR is gated on at instantaneous voltage $e'$, current commences to flow through the capacitance 35a and the gated-on SCR 34a for the relatively brief period of time required for that capacitance 35a to become charged to the instantaneous line voltage at that time. The sudden turn-on of the SCR 34a and the subsequent brief period of current flow therethrough produces the voltage spike 30 across the lines 36 and 37 of the transmitter 20, and it will be understood that this voltage spike appears on the AC line 10 and on any device directly connected to the AC line without passing through a low-pass device such as a power transformer or the like.

When the capacitance 35a becomes charged to the instantaneous line voltage, conduction through the SCR 34a drops below the minimum level necessary to sustain the SCR in gated-on condition and nothing further occurs in the transmitter section 20a during the remainder of the positive half-cycle. No conduction can occur through the SCR 34b in the transmitter section 20b during the positive half-cycle, of course, although the capacitance 35b is charged through the diode 38b during the positive half-cycle.

When the negative half-cycle 27 commences, it will be seen that the transmitter section 20b functions in the foregoing manner to produce another voltage spike 30 during that half-cycle. During that negative half-cycle, moreover, the capacitance 35a is again charged through the diode 38a connected across the SCR 34a to provide energy for another voltage spike 30 during the next positive half-cycle.

The receiver 19 is now considered in detail. It will be seen that the receiver includes a receiver section 19a which is responsive to control signal voltage spikes occurring during positive half-cycles, and a receiver section 19b which has inverted-polarity identity to the receiver section 19a and which is responsive to control signal voltage spikes occurring on the negative half cycles.

Considering the receiver section 19a, a gated switching device such as the SCR 50a is connected across the lines 51 and 52, and this SCR (as well as SCR 50b) must have sufficient current-handling capacity to accommodate the maximum current requirements of the intended load 12 with which the particular receiver embodiment will be used. The gate 53a of the SCR 50a is connected to the cathode side of a diode 54a, and the anode side of that diode is connected to a voltage divider provided by the resistances 55a and 56a. One end of the voltage divider resistance 56a is connected to the line 52, while an end of the voltage divider resistance 55a is connected to the line 51 through a parallel R-C circuit including the resistance 57a and the capacitance 58a. Alternatively, the cathode side of the diode 54a can be connected to the junction of resistances 55a and 57a.

The junction 62a of the voltage divider resistances 55a and 56a is connected to the collector of the control transistor 63a, and the base of that transistor is connected to the junction of another voltage divider provided by the resistances 64a and 65a. The resistance 65a is bypassed to the line 52 by the capacitance 66a, and the emitter of the transistor 63a is connected to the line 52.

The operation of the receiver 19 is now considered, with the assumption that the existing switch 14 (FIG. 1) is presently open and that the positive half-cycle 26 has just commenced on the AC line 10. The values of the voltage divider resistances 64a and 65a are chosen so that the control transistor 63a remains substantially nonconductive until the instantaneous power line voltage reaches a predetermined maximum voltage e, as previously discussed. Assuming that a voltage spike 30 appears on the AC line at a time before the transistor 63a becomes conductive, the capacitance 58a couples the voltage spike to the voltage divider resistances 55a and 56a. If the voltage spike 30 is of sufficient magnitude, the voltage developed across the resistance 56a and coupled to the gate 53a through the diode 54a will turn on the SCR 50a, thereby effectively connecting the load 12 to the AC line 10. The load 12 can now receive full power from the AC line during the half-cycle portion after the instantaneous voltage e', and it can be seen from FIG. 2 that power is supplied to the load during essentially all of the power portion of the positive half-cycle. The resistance 57a in parallel with the capacitance 58a prevents that capacitance from accumulating a charge sufficient to cause false triggering of the SCR 50a.

When the instantaneous AC line voltage reaches e in the absence of a voltage spike 30, the control transistor 63 becomes conductive as aforementioned and the gate 53a of the SCR 50 is effectively clamped to the cathode of that SCR, so that the SCR cannot become gated on for the remainder of the positive half-cycle irrespective of any voltage spikes or other transient conditions which may appear on the AC line during that time. The capacitance 66a prevents the control transistor from being prematurely turned on by the transient voltage spike 30. Resistance 55a limits the current to the gate 53a and diode 54a prevents the gate 53a from receiving current until the voltage at junction 62a exceeds both the forward drop across the diode 54a and the gate turn-on voltage of the SCR 50a. The resistance 56a functions to limit the negative voltage which is applied to the collector of the control transistor 63a, and to the gate 53a, during each negative half-cycle.

The receiver section 19b functions during each negative half-cycle in a manner identical to the foregoing description of the receiver section 19a. Each section 19a and 19b of the receiver switches load current during respective half-cycles of AC power.

It will be seen from the foregoing description of the receiver 19 that the voltage across the receiver lines 51 and 52 falls to zero volts, less the voltage drop across one of the SCRs 50a or 50b, as soon as the receiver is gated on by a detected voltage spike 30. Thus, the receiver 19 of the present invention operates without a constant connection across both sides of the AC line 10, so that the receiver can be connected directly in series with the control load as shown in FIG. 1.

The aforementioned series-connection capability of the present receiver makes this receiver particularly useful for modifying existing switch circuits for remote control.

Turning to FIG. 5, there is seen a conventional existing electric switch 70 which is normally received in a switch box 71 for connection to the pair of conductors 72 in the wiring cable 73 to a load which is normally controlled by the switch 70. For example, the switch 70 may be connected by the wiring cable 73 to control floodlights which may be located outside of a residence. The switch box 71 is attached to the wall stud 74 in accordance with conventional electrical wiring practice.

The components of the receiver 19 can be encapsulated in a potting composition or the like to provide a unitary receiver unit 75, from which extend the leads 51 and 52 corresponding to the same-numbered lines shown in FIG. 4. The receiver unit 75 is mounted on a U-shaped bracket 76 of sufficient depth to allow the bracket and the attached receiver unit 75 to be mounted within the switch box 71 behind the existing switch 70. The U-shaped bracket 76 is provided with mounting tabs 77 and 78 which allow the bracket to be secured within the switch box 71 by the same screws 79 which secure the existing switch 70 within that box. The receiver unit 75 may be fabricated so that the SCRs 50a and 50b of the receiver are mechanically connected to the U-shaped bracket 76 for heat dissipation.

The gated switching devices such as the SCRs 50a and 50b have been shown to carry the maximum current requirements of load 12 after being turned on by the transient voltage spike 30. During the period subsequent to being turned on in each half cycle in which a voltage spike 30 occurs, the internal resistance of SCRs 50a and 50b cause some electrical power to be generated within the confines of the receiver unit 75. During those voltage half cycles in which the voltage spike 30 does not occur and the control transistors 63a and 63b are consequently gated on, moreover, the current flow through resistors 64a and 64b, 57a and 57b, 55a and 55b, and the control transistors 63a and 63b causes some heat to be generated internally within the confines of the receiver unit 75. If the internally generated heat is not dissipated into the ambient environment surrounding the switch box 71, the internal temperature within switch box 71 will continue to rise until the components within the receiver unit 75 are damaged or are ignited and burn. The support bracket 76 and mounting tabs 77 and 78 are configured to serve the integral function of providing a transmission path of low thermal resistance to conduct the internally generated heat from the receiver unit 75 to the structural components of the existing switch 70 and switch box 71, from which the heat can be dissipated by convection and radiation to the ambient environment surrounding the switch box. The electrically insulated backing plates of the SCRs 50a and 50b can be riveted to the bracket 76 for heat transfer, while heat generated in other components of the receiver unit 75 is conducted through the potting composition to the bracket.

With a receiver unit 75 packaged as shown in FIG. 5, it will be understood that the receiver unit is readily installed in parallel circuit with an existing switch 70 which normally controls the floodlights (for example) outside of a residence. Installation of the switch 75 in no way impairs the normal operation of the existing switch 70. The transmitter unit 20 may then be plugged into any convenient electrical outlet serviced by the AC line in common with the existing switch 70, so that the floodlights or other load can be turned on and off by operating the transmitter control switch 21 while the existing switch 70 remains off. Alternatively, the receiver unit 75 could be attached to the back of a switch plate (not shown) which normally covers the existing switch 70. A metallic switch plate would be preferable to enhance dissipation of heat generated by the SCRs or other switching devices used in the receiver unit.

Still another utilization of the present remote switching system is shown in FIG. 6, wherein the receiver 19 is enclosed within a housing 82 having an AC plug 83 at one end and an AC socket 84 at another end. One of the prongs of the plug 83 is directly connected by the line 85 to one side of the socket 84, while the receiver 19 is connected in series between the corresponding other sides of the plug and socket. The plug 83 of the housing 82 can be plugged into any convenient AC receptacle, and it will be understood that AC power is switchably supplied to the socket 84 in response to the operation of a transmitter 20 which is plugged into or otherwise connected to the common AC power line.

Many alternative uses of the present remote switching system will suggest themselves to those skilled in the art. By way of example, the transmitter control switch 21 may be provided by switch contacts in another device such as an intrusion detector, a smoke alarm, a thermostat, or the like. The receiver, in such cases, would operate an appropriate alarm, signal, or control device. Moreover, other switching devices such as triacs can be used as substituted for the disclosed SCRs, wherever appropriate.

It will be understood that the foregoing relates only to preferred embodiments of the present invention, and that numerous alterations and modifications may be made therein without departing from the spirit and the scope of the invention as defined in the following claims.

We claim:
1. An electrical signaling system utilizing an electrical AC power distribution circuit, which may contain transient noise signals during peak portions of a cycle, for conveying control signals from a transmitting location to a receiving location, comprising:
   a transmitter connectable to the power distribution circuit at a transmitting location,
   said transmitter comprising signal producing means responsive to the instantaneous AC voltage on said power distribution circuit and selectively operative to impose a control signal on the power distribution circuit in the slope portion of the cycle before transient noise signals commence to appear in the peak portion of the cycle, so that no said control signal is imposed on the power distribution circuit during said peak portion; and
   a receiver connectable in circuit between said power distribution circuit and a load circuit which obtains operating power from said power distribution circuit;
   said receiver having a switching device in series with the load circuit and operative in response to a gate signal to establish a conductive circuit between said power distribution circuit and said load circuit; and
   said receiver further including means responsive to the presence of said control signal on said power distribution circuit to provide said gate signal to said switching device and also responsive to instantaneous AC voltage in said peak portion of the cycle on said power distribution circuit to prevent said switching device from becoming conductive in response to an apparent control signal which may appear on said power distribution circuit during the peak portions.

2. The system as in claim 1, wherein: said signal producing means is operative to impose said control signal on the power distribution circuit at a predetermined voltage which is less than the instantaneous AC voltage during the peak portions of the cycle.

3. The system as in claim 1, wherein: said signal producing means of said transmitter is operative to provide said control signal in the form of a transient signal which is superimposed on the instantaneous AC voltage in said slope portion of the cycle; and said means included in said receiver is responsive to said transient signal superimposed on the instantaneous AC voltage on said power distribution circuit in said slope portion.

4. The system of claim 1, wherein:
   said signal producing means of said transmitter comprises means responsive to the instantaneous AC voltage on the power distribution circuit to generate a transient signal condition when said instantaneous voltage reaches a certain voltage in said slope portion of the cycle, said transient signal condition comprising said control signal.

5. Control signal transmitting apparatus for imposing control signals on an AC power distribution circuit which may contain transient noise signals during peak portions of a cycle, comprising:

signal producing means connectable to the power distribution circuit and selectively operative to superimpose a transient control signal on the AC voltage present in the power distribution circuit; and means responsive to the instantaneous AC power line voltage on said power distribution circuit to operate said signal producing means only when a predetermined instantaneous voltage is in the slope portion of the cycle before transient noise signals commence to appear on the peak portion of the cycle, so that no said control signal is imposed on the power distribution circuit during the peak portion.

6. Control signal transmitting apparatus as in claim 5, wherein:

said signal producing means includes a gated switching means selectively connected in series with a capacitance across said power distribution circuit; and said gated switching means is connected to said instantaneous voltage responsive means to receive a gating signal which makes said gated switching means conductive.

7. Control signal transmitting apparatus as in claim 6, further comprising circuit means operatively associated with said capacitance to charge said capacitance before said gated switching means receives said gating signal, so that the discharge of said capacitance when said gated switching means becomes conductive produces said transient control signal.

8. Control signal receiving apparatus entirely connectable in series circuit between an AC power distribution circuit which may contain transient noise signals during peak portions of a cycle and a load circuit, comprising:

gated load current switching means connected in said series circuit between line and load, and operative in response to the appearance of a predetermined control signal across said switching means when nonconductive in the presence of voltage on said power distribution circuit so as to establish a load current conductive circuit through said switching means between said power distribution circuit and said load circuit; and control means connected across said switching means and responsive to instantaneous AC power line voltage in a peak portion of the cycle on said power distribution circuit to prevent said switching means from becoming conductive in response to an apparent control signal which may appear across said switching means during said peak portion.

9. Control signal receiving apparatus as in claim 8, wherein:

said switching means is operative to establish said conductive circuit in response to a transient control signal; and said control means is responsive to the instantaneous AC voltage on said power distribution circuit across said nonconductive switching means to prevent said switching means from responding to a transient control signal when the instantaneous voltage exceeds a predetermined voltage which is less than the instantaneous voltage during said peak portions of the cycle.

10. Control signal receiving apparatus as in claim 9, wherein:

said switching means has a gate circuit; and said control means comprises a signal switching device connected to the gate circuit of said switching means and operative in response to said predetermined instantaneous AC voltage to prevent transient signals on said power distribution circuit from controlling said gate circuit.

11. Control signal receiving apparatus as in claim 8, further comprising:

receiver support means supporting said signal receiving apparatus and configured to fit within a box for receiving an existing load circuit switch, along with the load circuit switch; and circuit means connecting said signal receiving apparatus in parallel circuit across the existing load circuit switch, so that the load circuit can be connected to the power distribution circuit either by operation of the existing load circuit switch or by operation of said signal receiving apparatus in response to a said control signal on the power distribution circuit to establish said conductive circuit through said switching means in parallel with said existing load switch.

12. Control signal receiving apparatus as in claim 11, wherein said support mens comprises a U-shaped bracket having a pair of mounting tabs which are retained by the mounting fasteners for the existing load circuit switch, and a receiver support section which is connected to said tabs and extends backwardly therefrom to dispose said receiver within said box in the space therein behind said existing switch.

13. Control signal receiving apparatus which is completely disposable within a conventional AC power distribution switch box along with an existing switch for selectably connecting an electrical load to the power distribution circuit, comprising:

signal responsive gatable switching means connected in parallel with said existing switch so as to be in series between said power distribution circuit and said load within the switch box when the existing switch is open-circuit;

said gatable switching means being operative in response to a gating signal on the power distribution circuit to complete a circuit between the power distribution circuit and a load circuit;

heat conductive support means mounted in good heat transfer relation to said gated switching means to receive heat which is generated by said gated switching means; and a heat conductive bracket in heat conductive relation to said support means and with mounting means retained in heat conductive relationship with the switch box, said bracket positioning said gatable switching means within the switch box behind such existing switch therein, so that the heat generated by said gatable switching means is conducted through said mounting means and said bracket to the switch box for dissipation to ambient atmosphere surrounding the switch box.

14. Apparatus as in claim 13, wherein said bracket comprises a pair of mounting tabs which are retained in good heat transfer relation between the switch box and the existing switch, so that heat from said gatable switching means is conducted to the switch box and the existing switch.

15. The system as in Claim 1, wherein said receiver is entirely connectable in series circuit between said power distribution circuit and said load circuit so that no more than nominal voltage drop exists across said receiver whenever said conductive circuit is established through said switching device.

* * * * *